Nov. 4, 1952 L. E. RAUSENBERGER 2,616,583
FILLER CAP ASSEMBLY
Filed March 20, 1950 2 SHEETS—SHEET 1
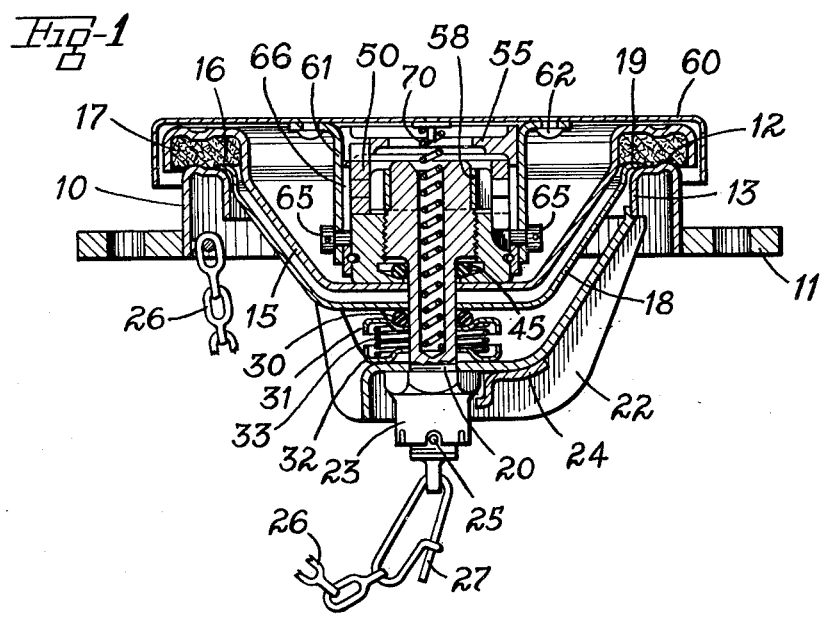
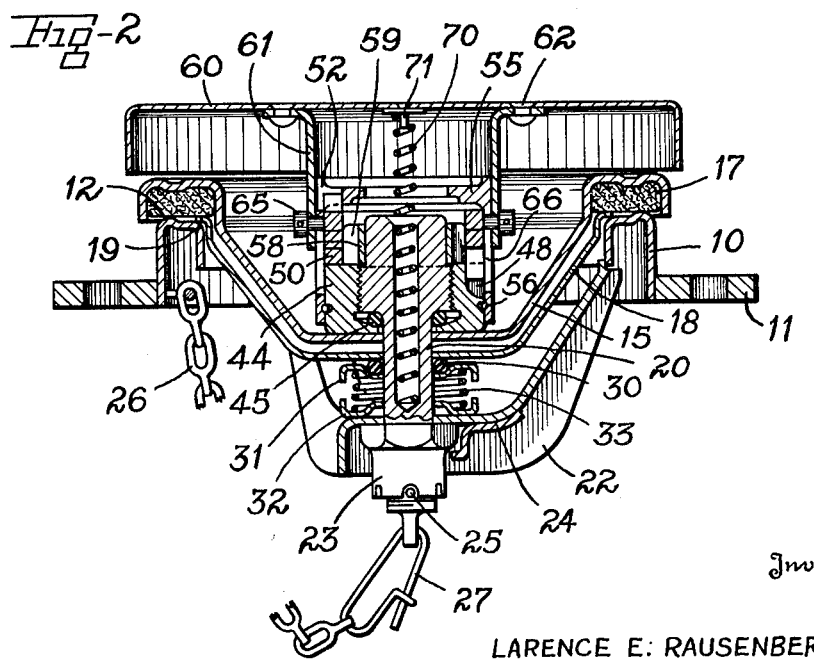
Inventor
LARENCE E. RAUSENBERGER
By Marechal & Biebel
ATTORNEYS Nov. 4, 1952     L. E. RAUSENBERGER     2,616,583
FILLER CAP ASSEMBLY
Filed March 20, 1950     2 SHEETS—SHEET 2
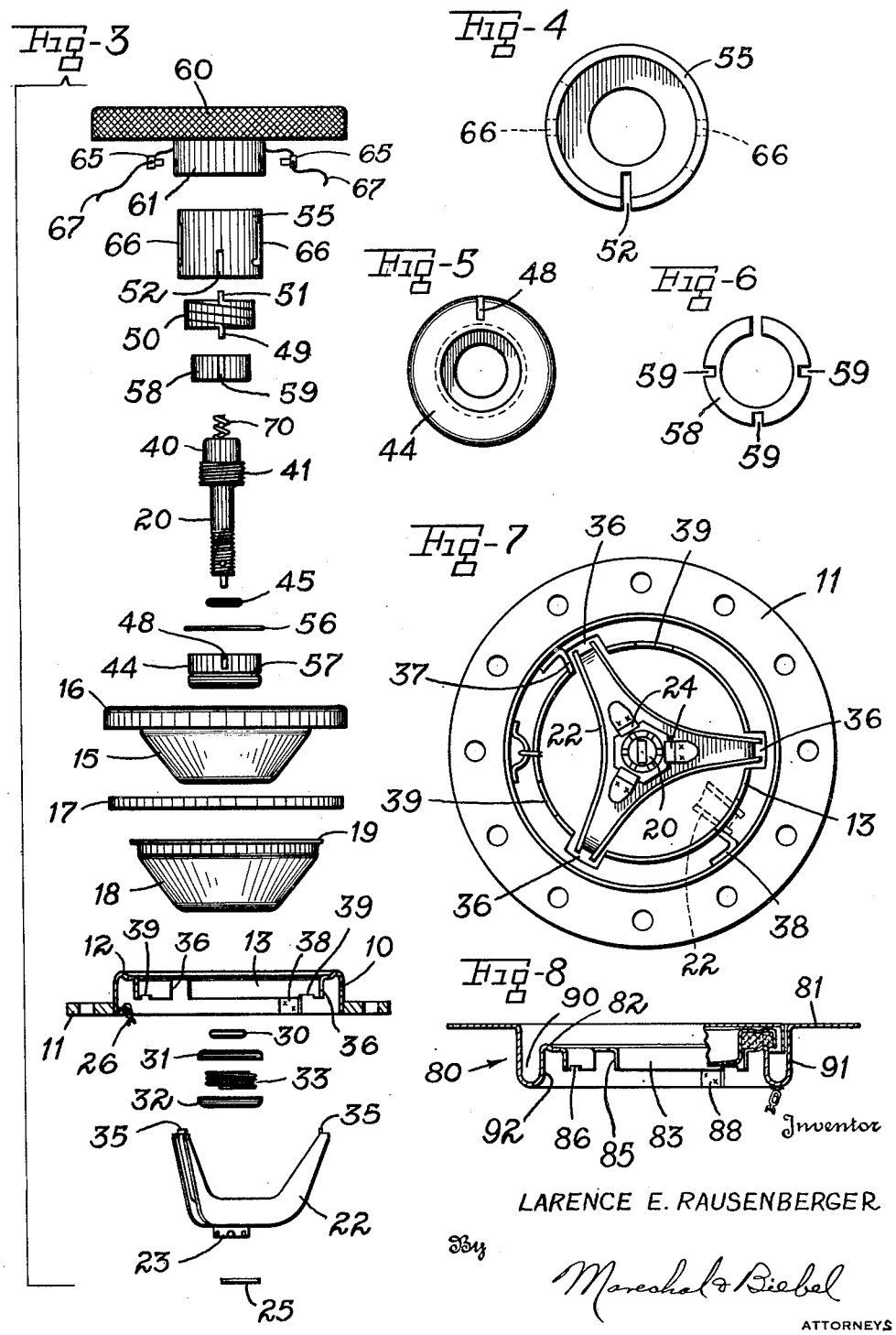
Inventor
LARENCE E. RAUSENBERGER
By Marechal & Biebel
ATTORNEYS Patented Nov. 4, 1952

2,616,583

UNITED STATES PATENT OFFICE 2,616,583

FILLER CAP ASSEMBLY

Larence E. Rausenberger, Springfield, Ohio, assignor to The Steel Products Engineering Company, Springfield, Ohio, a corporation of Ohio Application March 20, 1950, Serial No. 150,655

13 Claims. (Cl. 220—25)

This invention relates to a filler cap assembly.

The invention has particular relation to filler cap assemblies adapted for use with fuel tanks and other containers wherein the interior of the container is under pressure, such for example as in the case of fuel tanks for airplanes.

One of the principal objects of the invention is to provide a filler cap assembly for the inlet of a container to retain the contents thereof under positive pressure in which the cover of the assembly is separate from the closure portion and serves as a handle for effecting movement of the closure into and out of sealing position, and also in which this cover is shiftable between a raised position for convenient operation and a retracted position closely adjacent the cover, thus facilitating incorporation of the assembly in a flush type mounting offering minimum wind resistance for installations such as on wing tanks of airplanes.

Another object of the invention is to provide a filler cap assembly which includes a closure adapted to seat on the rim of the inlet opening and a clamp adapted to engage the underside of the rim to secure the closure in sealing position, which also includes a threaded operative connection between the clamp and closure for shifting the same between their respective sealing and release positions, and in which overtightening of the operating means is prevented by safety devices cooperating with the operative connection between the closure and clamp to limit the degree of tightening movement thereof.

An additional object of the invention is to provide a filler cap assembly wherein the rotational movement of the operating handle is transmitted to the closure and clamp through a torsion spring which is so arranged with relation to the other parts of the assembly as to wind up and lock in the event of overtightening in order to provent damage to any of the parts resulting from such overtightening.

It is also an object of the invention to provide a filler cap assembly wherein the cover serves as an operating handle for releasing and sealing the closure and is adapted to be retracted into substantially flush relation with the surrounding surface of the container for minimum wind resistance and is fitted with a spring arranged to raise the cover to an operating position, and wherein provision is made for releasably locking the cover in its retracted position by a simple rotational movement of a relatively few degrees.

Other objects and advantages of the invention will be apparent from the following description, the accompanying drawings and the appended claims.

In the drawings,

Fig. 1 is a view in vertical section of a filler cap assembly in accordance with the invention showing the closure member thereof in sealing position and with the handle or cover retracted;

Fig. 2 is a view similar to Fig. 1 showing the handle raised for operation and the assembly released preparatory to removal;

Fig. 3 is an exploded view of the assembly partly in side elevation and partly in vertical section;

Fig. 4 is a detail view of the sleeve which forms a housing for transmitting the clamping torque from the handle to the assembly;

Fig. 5 is a detail view of the adjusting nut for tightening and releasing the assembly;

Fig. 6 is a detail view of the clamping ring preventing excess tightening of the assembly;

Fig. 7 is an elevational view of the assembly from the under side thereof; and

Fig. 8 is a fragmentary sectional view showing the assembly incorporated with an adapter of a different form to give a flush type mounting.

Referring to the drawings, which illustrate preferred embodiments of the invention, the adapter 10 includes a peripheral flange portion 11 adapted to be riveted or otherwise secured to a container such as a fuel tank of an aircraft or other vehicle. The adapter includes an annular rim 12 which extends above the flange 11 and surrounds the filling opening. This rim includes an outer portion raised above the level of its inner portion, and this recessed inner portion terminates in a turned down flange 13 extending inwardly of the filling opening.

The main closure member 15 is generally cup-shaped and includes a turned over rim portion 16 serving as a retainer for an annular gasket 17 adapted to seat on the rim 12 to seal the filling opening. A pressure plate 18 of cup-like section fits over the lower portion of the closure member 15, and it includes a peripheral flange adapted to seat along the inner periphery of rim 12 to help in retaining the inner portion of gasket 17 in position. Thus if a great amount of pressure were exerted against the rim 12 by a small portion of gasket 17, the gasket would tend to deform quickly and thus lose some of its sealing ability, and this undesirable result is prevented by the provision of the pressure plate 18. It will also be seen that as the pressure within the container increases, the inner portion of gasket 17 may be forced outwardly towards the raised portion of rim 12, thus increasing the sealing ability of the gasket.

A stud 20 extends through the closure member 15 and pressure plate 18, and the lower end of this stud carries a three-pronged clamping member 22, which is supported on the stud by a castellated nut 23, the clamp and nut being secured together by means of three retainers 24 which are welded to the under surface of the clamp and overlap the nut as shown in Figs. 1, 2 and 7. A pin 25 is secured in the lower end of stud 20 to prevent separation of the stud and nut 23, and the stud is also loosely connected with adapter 10 by means of a chain 26 and safety pin 27. The opening in pressure plate 18 through which stud 20 extends is sealed by means of a rubber O-ring 30 held in position by a pair of thrust washers 31 and 32 and a spring 33 positioned between the pressure plate and the upper surface of clamp 22.

The upper ends of the prong or arm portions of clamp 22 are adapted to seat against the lower rim of the flange 13 on adapter 10, and each of these clamp arms includes an upwardly extending tab 35, these tabs being proportioned to fit within the flange 13 and serve as centering guides. In order to provide for insertion of the clamp 22 through adapter 10 and for removal of the clamp incident to opening the cap assembly, the flange 13 and the inner portion of rim 12 are provided with three slots 36 for receiving the ends of the clamp arms. Two stops 37 and 38 (Fig. 7) are welded to the adapter 10 below flange 13 to limit rotation of the clamp following insertion thereof through slots 36, the stop 37 being positioned immediately adjacent one of slots 36 and the other stop 38 being positioned adjacent one of three shallow cam notches 39 located intermediate the slots 36.

The upper end portion of stud 20 is larger than its lower portion and includes a smooth cylindrical part 40 and a threaded part 41. An adjusting nut 44 of cup-like section and relatively large outer diameter is threaded on the threaded portion 41 of the stud, and a rubber O-ring 45 is provided between these parts to prevent damage to the threads resulting from undue tightening of the nut on the stud and also to serve as a friction brake preventing relative rotation of these parts during removal and replacement of the assembly. The upper end of nut 44 is slotted at 48 to receive the turned down end 49 of a torsion spring 50, and the other end of this spring is turned up at 51 and fits within a slot 52 in the sleeve 55 which forms the housing for the spring. The housing 55 is secured at its lower end to the nut 44 by means of a split ring 56 fitted in a groove 57 in the outer surface of nut 44 and in a complementary groove in the inner wall of housing 55. A split clamping ring 58 fits loosely on the cylindrical portion 40 of stud 20 within the spring 50, and it is provided with angularly spaced slots 59 in its outer surface for increased flexibility.

The operating handle of the assembly 60 also forms the cover for the assembly, and it carries a sleeve 61 which is secured thereto as by means of rivets 62. The sleeve 61 has a sliding fit over the housing 55, and two pins 65 extend through the wall of sleeve 61 and engage within bayonet slots 66 in the wall of housing 55 to provide a driving connection between the cover 60 and the housing 55. The pins 65 are secured to the sleeve 61 by means such as a locking wire 67 extending through bores in the heads of the pins. A spring 70 is mounted in the bore in the upper portion of stud 20 to bias the cap 60 upwardly to the extent permitted by a movement of pin 65 in slots 66, the upper end of spring 70 being held by a retainer pin 71 riveted in the cap 60.

Fig. 1 shows the assembly in closed and sealed position. The upper ends of the clamp arms 22 are seated against the lower rim of flange 13 within the cam notches 39, and the nut 44 is in its low position with respect to stud 20 wherein it has carried closure member 15 towards clamp 22 in such manner that the gasket 17 is pressed tightly against the rim 12. Also, the cover or handle 60 is in its lowermost position wherein the pins 65 are engaged in the shorter legs of the bayonet slots 66. In this position of the parts, pressure from within the container is initially exerted on the pressure plate 18 and causes its rim 19 to be forced into tighter relation with the gasket 12. Furthermore, since the adjusting nut 44 is of comparatively large diameter at its lower end where it is in contact with the closure 15, an outer diameter of the order of 1.120 inches for this area of contact having been found satisfactory in an assembly wherein the diameter of the inlet opening across rim 12 is 3.125 inches, the pressure is well distributed over the central portion of closure 15 to minimize its possibility of deformation of its rim portion in use.

In order to open the assembly, the first step is to press down on cover 60 and rotate it to a sufficient extent to shift the pins 65 into the longer legs of the slots 66, whereupon the spring 70 will urge the cover upwardly to the position shown in Fig. 2 for more convenient handling. The cover is then rotated in counterclockwise direction as viewed from above, and this movement is transmitted through the torsion spring 50 to the nut 44, causing the latter to move upwardly with respect to stud 20. This in turn causes the nut and closure member 18 to draw away from the clamp 22, this movement being aided by the spring 33. During the first part of this movement, the clamp arms are prevented from rotation by their engagement in the cam notches 39, but as soon as the unscrewing has proceeded to a sufficient extent to permit the clamp arms to clear these notches, the clamp also rotates until one of its arms strikes the stop 37. In this relative position of the parts, the clamp arms are aligned with the slots 36, and the assembly can accordingly be lifted out of the adapter.

To mount the assembly in sealing position, the reverse procedure is followed. The unit is set in place by inserting the clamp arms through the slots 36 and then rotating the cover 60 in clockwise direction as viewed from above. The first few degrees of this rotation will turn the clamp 22 until one of its arms strikes the stop 38, and continued rotation of the cover will cause the adjusting nut 44 to move downwardly with respect to stud 20 and thus to draw the closure member 15 and clamp 22 together into sealing position. During this latter rotational movement, the upper ends of the clamp arms are tightened in seated position within the cam notches 39 to effect definite positioning of the clamp when the cap is under pressure and thus to prevent possible vibration of the clamp in such manner that it might twist back to its release position in alignment with the slots 36. Over-tightening of the unit is effectively prevented by means of the clamping ring 58, which serves as a safety device since if excessive torque is applied to the cover, the spring 50 will be wound up in such manner as to compress ring 58 into clamped relation against the smooth cylindrical upper portion 40 of stud 20 to prevent further tightening. Similarly the O-ring 45 serves as a safety device cushioning nut 44 and stud 20 against damage to their threaded portions resulting from over-screwing in the opposite direction, and it also provides friction between stud 20 and nut 44 during replacement of the assembly to prevent relative rotation of these parts until after the clamp 22 has been rotated against stop 38 into its locked position. The final step in the closing operation is to press cover 60 downwardly against spring 70 and twist it sufficiently to lock the pins 65 in the short legs of the bayonet slots 66.

It will thus seem that the present invention provides a simple filler cap assembly which has been found highly suitable for uses such as with fuel tanks for aircraft. Thus a filler cap assembly constructed as described and shown has been found fully satisfactory for use with the fuel tanks of military aircraft under tests covering a wide range of service conditions, including leakage, vibration and gunfire at temperatures as low as minus 70° F. and pressures as high as 100 pounds per square inch. It should also be noted that this assembly is not limited to use with the particular adapter 10 shown in Figs. 1 to 3, and Fig. 8 shows fragmentarily the assembly in connection with an adapter 80 constructed to provide a flush type mounting for the assembly such as in closed position, the cover 60 will be flush with the adjacent surface of the tank.

Referring to Fig. 8, the adapter 80 includes a peripheral flange 81 which is positioned above the level of its rim portion 82 and is adapted to be secured to the fuel tank or other container. The rim 82 is formed in the same manner as the rim 12, and its inner portion terminates in a turned down flange 83 corresponding with the flange 13 and similarly provided with slots 85 and cam notches 86 and a stop 88 for cooperation with the arms of the clamp 22. The respective portions of this adapter are so formed that an annular recess 90 is defined between the downwardly extending portion 91 of the adapter and the upwardly extending portion 92 which supports the rim 82. This recess is adapted to receive the rim portion of the cover 60 in the lowermost position of the cover, and the part 92 of the adapter is so proportioned that in this closed position of this assembly, the upper surface of the cover 60 will be substantially flush with the flange portion 81 and thus with the surrounding surface of the tank. This flush type mounting is accordingly particularly useful for installations such as on wing fuel tanks of aircraft, since it provides minimum resistance to air flow as a result of the substantial absence of projecting parts.

Reference is made to the copending applications of L. E. Rausenberger and D. L. Getz, Serial No. 150,656, and W. B. Condit and D. L. Getz, Serial No. 150,688 filed of even date herewith and assigned to the same assignee as this application.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A filler cap assembly for the inlet of a container to retain positive pressure on the contents thereof, comprising an adapter for said container including an annular rim defining an inlet opening, a closure adapted to seat on said rim, a clamp adapted to engage the under side of said rim, means supporting said clamp and extending through said closure, operating means on said supporting means for causing relative clamping and unclamping movement of said clamp and closure, a cover for said assembly, means forming a driving connection between said cover and said operating means to cause operative movement of said operating means in response to rotation of said cover, means supporting said cover for movement with respect to said operating means between a raised position for operation and a retracted position wherein said cover overlies said closure, and means for releasably retaining said cover in said retracted position.

2. A filler cap assembly for the inlet of a container to retain positive pressure on the contents thereof, comprising an adapter including a peripheral flange adapted to be secured to said container and an annular rim defining an inlet opening, said rim being positioned below and radially inwardly of said flange, a closure adapted to seat on said rim, a clamp adapted to engage the under side of said rim, means supporting said clamp and extending through said closure, operating means on said supporting means for causing relative clamping and unclamping movement of said clamp and closure, a cover for said assembly, means forming a driving connection between said cover and said operating means to cause operative movement of said operating means in response to rotation of said cover, means supporting said cover for movement with respect to said closure between a raised portion for operation and a retracted position wherein said cover is received within said adapter with the upper surface thereof substantially flush with said flange portion of said adapter, and means for releasably retaining said cover in said retracted position.

3. A filler cap assembly for the inlet of a container to retain positive pressure on the contents thereof, comprising an adapter including a peripheral flange adapted to be secured to said container and an annular rim defining an inlet opening, said rim being positioned below and radially inwardly of said flange, a closure adapted to seat on said rim, a clamp adapted to engage the under side of said rim, operating means connecting said clamp and said closure for relative movement into and out of clamping relation with each other and said rim, a cover for said assembly, means operatively connecting said cover with said operating means for actuating said operating means in response to rotation of said cover, means supporting said cover for movement with respect to said closure between a raised position for operation and a retracted position wherein said cover is received within said adapter with the upper surface thereof substantially flush with said flange portion of said adapter, and means for releasably retaining said cover in said retracted position.

4. A filler cap assembly for the inlet of a container to retain positive pressure on the contents thereof, comprising an adapter including a peripheral flange adapted to be secured to said container and an annular rim defining an inlet opening, said rim being positioned below and radially inwardly of said flange, a closure adapted to seat on said rim, a clamp adapted to engage the under side of said rim, operating means connecting said clamp and said closure for relative movement into and out of clamping relation with each other and said rim, said operating means and said cover including complementary projecting and slotted portions forming a driving connection between said cover and said operating means to actuate said operating means in response to rotation of said cover, said slotted portion being arranged generally axially of said assembly to provide for movement of said cover with respect to said closure between a raised position for operation and a retracted position wherein said cover is received within said adapter recess with the upper surface thereof substantially flush with said flange portion of said adapter, means for biasing said cover to said raised position, and said slotted portion including a laterally offset part cooperating with said rejecting portion to retain said cover in said retracted position in response to relative rotation of said projecting and slotted portions.

5. A filler cap assembly for the inlet of a container to retain positive pressure on the contents thereof, comprising an adapter for said container including an annular rim defining an inlet opening, a closure adapted to seat on said rim, a clamp adapted to engage the under side of said rim, a stud supporting said clamp and extending through said closure, an adjusting member rotatable on said stud above said closure, means for causing clamping and unclamping movement of said clamp and said closure in response to rotation of said adjusting member on said stud, a cover for said assembly, and a torsion spring forming a driving interconnection between said cover and said adjusting member for causing said rotation of said member on said stud in response to rotation of said cover.

6. A filler cap assembly for the inlet of a container to retain positive pressure on the contents thereof, comprising an adapter for said container including an annular rim defining an inlet opening, a closure adapted to seat on said rim, a clamp adapted to engage the under side of said rim, a stud supporting said clamp and extending through said closure, an adjusting member rotatable on said stud above said closure, means for causing clamping and unclamping movement of said clamp and said closure in response to rotation of said adjusting member on said stud, a torsion spring arranged coaxially with said adjusting member, means connecting one end of said spring with said adjusting member, a housing for said spring, means connecting the other end of said spring to said housing, a cover for said assembly and means forming a driving connection between said cover and said housing to transmit rotational movement of said cover to said adjusting member through said spring for effecting said rotation of said member on said stud.

7. A filler cap assembly for the inlet of a container to retain positive pressure on the contents thereof, comprising an adapter for said container including an annular rim defining an inlet opening, a closure adapted to seat on said rim, a clamp adapted to engage the underside of said rim, a stud supporting said clamp and extending through said closure, an adjusting member rotatable on said stud above said closure, means for causing clamping and unclamping movement of said clamp and said closure in response to rotation of said adjusting member on said stud, a torsion spring arranged coaxially with said adjusting member and having one end thereof secured thereto, a housing for said spring and adjusting member, means securing said housing against axial movement with respect to said adjusting member while leaving said housing free to rotate on said member, means connecting the other end of said spring to said housing, a cover for said assembly, and means forming a driving connection between said cover and said housing to transmit rotational movement of said cover to said adjusting member through said spring for effecting said rotation of said member on said stud.

8. A filler cap assembly for the inlet of a container to retain positive pressure on the contents thereof, comprising an adapter for said container including an annular rim defining an inlet opening, a closure adapted to seat on said rim, a clamp adapted to engage the underside of said rim, a stud supporting said clamp and extending through said closure, an adjusting member rotatable on said stud above said closure, means for causing clamping and unclamping movement of said clamp and said closure in response to rotation of said adjusting member on said stud, a cover for said assembly, a torsion spring mounted coaxially with said stud and forming a driving connection between said adjusting member and said cover to cause said rotation of said member on said stud to rotation of said cover, and a clamping ring positioned between and concentric with said stud and said spring and adapted to clamp against said stud in response to winding of said spring to bind said adjusting member and stud with respect to each other for preventing over-tightening thereof.

9. A filler cap assembly for the inlet of a container to retain positive pressure on the contents thereof, comprising an adapter for said container including an annular rim defining an inlet opening, a cup shaped closure having an overturned peripheral portion adapted to retain a gasket in position to seat on said rim, a gasket mounted in said overturned portion of said closure, a clamp adapted to engage the under side of said rim, a stud supporting said clamp and extending through said closure, operating means cooperating with said stud to cause relative clamping movement of said clamp and said closure towards each other to secure said gasket in sealing relation with said rim, and a cup shaped pressure member positioned between said clamp and said closure and including a peripheral flange adapted to be received within said overturned portion of said closure and between said gasket and said rim to minimize inward deflection of said gasket under pressure from said operating means.

10. A filler cap assembly for the inlet of a container to retain positive pressure on the contents thereof, comprising an adapter for said container including an annular rim defining an inlet opening, a closure adapted to seat on said rim, a clamp adapted to engage the underside of said rim, a stud including a portion of larger diameter positioned above said closure and a portion of reduced diameter extending through said closure and supporting said clamp thereon, a nut threaded on said larger portion of said stud, and operating means for adjusting said nut on said stud to cause relative clamping and unclamping movement of said clamp and said closure with respect to each other and said rim, said nut including a portion of reduced inner diameter adapted to overlap the lower end of said larger portion of said stud to limit relative movement of said stud and nut in the direction causing unclamping movement of said clamp.

11. A filler cap assembly for the inlet of a container to retain positive pressure on the contents thereof, comprising an adapter for said container including an annular rim defining an inlet opening, a closure adapted to seat on said rim, a clamp adapted to engage the underside of said rim, a stud including a portion of larger diameter positioned above said closure and a portion of reduced diameter extending through said closure and supporting said clamp thereon, a nut threaded on said larger portion of said stud, operating means for adjusting said nut on said stud to cause relative clamping and unclamping movement of said clamp and said closure with respect to each other and said rim, said nut including a portion of reduced inner diameter adapted to overlap the lower end of said larger portion of said stud to limit relative movement of said stud and nut in the direction causing unclamping movement of said clamp, and a yieldable gasket member positioned between said larger portion of said stud and said overlapping portion of said nut to prevent damage to the threads on said stud and nut resulting from over-screwing thereof.

12. A filler cap assembly for the inlet of a container to retain positive pressure on the contents thereof, comprising an adapter for said container including an annular rim defining an inlet opening, a closure adapted to seat on said rim, a clamp adapted to engage the underside of said rim, a stud supporting said clamp and extending through said closure, an adjusting member rotatable on said stud above said closure, means for causing relative clamping and unclamping movement of said clamp and said closure in response to rotation of said adjusting member on said stud, a torsion spring arranged coaxially with said adjusting member and having one end thereof secured thereto, a housing for said spring and adjusting member, means securing said housing against axial movement with respect to said adjusting member while leaving said housing free to rotate on said member, means connecting the other end of said spring to said housing, a cover for said assembly, a sleeve on said cover adapted for telescoping movement on said housing between a raised position for operation and a retracted position closely adjacent said closure, and means forming a driving connection between said sleeve and said housing for transmitting rotational movement of said cover through said spring to said adjusting member to cause said rotation of said member on said stud.

13. A filler cap assembly for the inlet of a container to retain positive pressure on the contents thereof, comprising an adapter for said container including an annular rim defining an inlet opening, a closure adapted to seat on said rim, a clamp adapted to engage the underside of said rim, a stud supporting said clamp and extending through said closure, an adjusting member rotatable on said stud above said closure, means for causing relative clamping and unclamping movement of said clamp and said closure in response to rotation of said adjusting member on said stud, a torsion spring arranged coaxially with said adjusting member and having one end thereof secured thereto, a housing for said spring and adjusting member, means securing said housing against axial movement with respect to said adjusting member while leaving said housing free to rotate on said member, means connecting the other end of said spring to said housing, a cover for said assembly, a sleeve on said cover adapted for telescoping movement on said housing between a raised position for operation and a retracted position closely adjacent said closure, means for biasing said cover to said raised position, said housing having an axially arranged slot therein, a projection on said sleeve engaging within said slot to form a driving connection between said sleeve and said housing for transmitting rotational movement of said cover through said spring to said adjusting member to cause said rotation of said member on said stud, said slot being closed at the upper end thereof to limit upward movement of said sleeve, and said slot including a laterally offset position at the lower end thereof adapted to cooperate with said pin to secure said cover in said retracted position.

LARENCE E. RAUSENBERGER.

REFERENCES CITED

The following references are of record in the file of this patent:

UNITED STATES PATENTS

| Number | Name | Date |
| --- | --- | --- |
| 1,845,409 | Golden | Feb. 16, 1932 |
| 2,316,507 | Dykeman | Apr. 13, 1943 |
| 2,375,671 | Malluk | May 8, 1945 |